(12) United States Patent
Johns et al.

(10) Patent No.: US 10,793,083 B1
(45) Date of Patent: Oct. 6, 2020

(54) ITEM HOLDING ASSEMBLY FOR A VEHICLE

(71) Applicant: Ford Global Technologies, LLC, Dearborn, MI (US)

(72) Inventors: Ian S. Johns, Woodhaven, MI (US); James Kostrzewa, Novi, MI (US); Hue Robinson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 16/398,684

(22) Filed: Apr. 30, 2019

(51) Int. Cl.
*B60R 11/02* (2006.01)
*B60R 11/00* (2006.01)

(52) U.S. Cl.
CPC ...... *B60R 11/0241* (2013.01); *B60R 2011/0007* (2013.01); *B60R 2011/0075* (2013.01); *B60R 2011/0082* (2013.01); *B60R 2011/0084* (2013.01); *B60R 2011/0085* (2013.01)

(58) Field of Classification Search
CPC ......... B60R 11/0241; B60R 2011/0007; B60R 2011/0082; B60R 2011/0075; B60R 2011/0085; B60R 2011/0084
USPC ...................................................... 296/24.34
See application file for complete search history.

(56) References Cited

U.S. PATENT DOCUMENTS

| | | | | |
|---|---|---|---|---|
| 4,087,126 A | * | 5/1978 | Wynn | B60R 11/02 296/37.8 |
| 4,640,542 A | * | 2/1987 | Watjer | B60R 11/0241 224/539 |
| 5,556,017 A | * | 9/1996 | Troy | B60R 11/0241 224/549 |
| 5,996,866 A | * | 12/1999 | Susko | B60R 11/0241 224/281 |
| 6,616,206 B2 | * | 9/2003 | Luginbill | B60N 3/10 296/37.8 |
| 6,929,304 B1 | * | 8/2005 | Dry | A47C 7/72 224/539 |
| 7,188,882 B2 | * | 3/2007 | Dry | B60N 3/102 296/37.8 |
| 7,194,087 B2 | | 3/2007 | Luginbill et al. | |
| 7,413,229 B2 | | 8/2008 | Kukucka et al. | |
| D609,001 S | * | 2/2010 | Gates | D3/218 |
| 8,200,293 B2 | * | 6/2012 | Park | B60R 11/0241 455/575.1 |
| 8,556,320 B2 | * | 10/2013 | Yamagishi | B60R 7/04 296/24.34 |
| 8,816,636 B2 | | 8/2014 | Shinde et al. | |
| 8,979,060 B1 | * | 3/2015 | Olsson | F16M 13/00 248/634 |
| 9,327,659 B2 | * | 5/2016 | Lambert | H02J 7/025 |
| 9,469,253 B2 | | 10/2016 | Brunard et al. | |
| 9,722,456 B2 | * | 8/2017 | Lambert | H02J 50/10 |

(Continued)

*Primary Examiner* — Justin M Larson
(74) *Attorney, Agent, or Firm* — David Coppiellie; Price Heneveld LLP

(57) ABSTRACT

An item holding assembly for a vehicle is disclosed herein. The assembly includes a bin that defines an inner cavity. A holder assembly is pivotally coupled to the bin and comprises a support feature and a holder feature coupled to the support feature. The holder assembly is configured to pivot into the inner cavity, which is defined by the bin, from a stowed position to an open position. The holder feature is operable to translate relative to the support feature between a retracted position and an extended position.

20 Claims, 7 Drawing Sheets

(56) References Cited

U.S. PATENT DOCUMENTS

| | | | |
|---|---|---|---|
| 9,783,124 B2* | 10/2017 | Catlin | H04B 1/3877 |
| 10,173,599 B2* | 1/2019 | Gaw, Jr. | B60R 7/04 |
| 10,486,615 B1* | 11/2019 | Shibata | B60R 11/0241 |
| 10,493,922 B2* | 12/2019 | Perez | B60R 11/0241 |
| 10,569,719 B2* | 2/2020 | Yamada | B60R 11/0241 |
| 10,640,053 B2* | 5/2020 | Yamada | B60R 11/0252 |
| 2012/0091948 A1* | 4/2012 | Shinde | B60R 7/04 |
| | | | 320/108 |
| 2017/0144613 A1 | 5/2017 | Catlin et al. | |
| 2018/0345874 A1* | 12/2018 | Thain | B60R 11/0258 |
| 2019/0089186 A1* | 3/2019 | Han | H02J 7/0045 |
| 2020/0130602 A1* | 4/2020 | Tena Han | B60R 11/02 |
| 2020/0130605 A1* | 4/2020 | MacNeil | B60R 11/0241 |
| 2020/0148130 A1* | 5/2020 | Palaka | H02J 7/0044 |

* cited by examiner

ITEM HOLDING ASSEMBLY FOR A VEHICLE

FIELD OF THE INVENTION

The present invention generally relates to a bin for use in a vehicle. In particular, the present invention relates to a bin for a vehicle having a holder assembly coupled to the bin and configured to hold an item.

BACKGROUND OF THE INVENTION

Vehicles are commonly equipped with floor consoles. The floor consoles often include cup holders, bins, and other storage compartments for storing items; however, in many cases vehicle floor consoles do not provide storage solutions that enable the vehicle occupant to both store and access small items, such as a cellular phone or credit card.

SUMMARY OF THE INVENTION

According to one aspect of the present invention, an assembly for holding an item in a vehicle is disclosed. The assembly includes a bin that defines an inner cavity. A holder assembly is pivotally coupled to the bin and comprises a support feature and a holder feature coupled to the support feature. The holder assembly is configured to pivot into the inner cavity, which is defined by the bin, from a stowed position to an open position. The holder feature is operable to translate relative to the support feature between a retracted position and an extended position.

Embodiments of the first aspect of the invention can include any one or a combination of the following features:
  the holder feature comprises a receptacle configured to hold an item;
  the holder assembly is configured to pivot vehicle forward from the stowed position to the open position;
  the holder assembly partially defines the inner cavity when the holder assembly is in the stowed position;
  the support feature comprises a hinge feature pivotally coupled to the bin, and a panel member coupled to the hinge feature; and
  the panel member of the support feature is disposed generally vertically when the holder assembly is in the stowed position.

According to another aspect of the present invention, the floor console assembly for holding an item in a vehicle is disclosed. The floor console assembly includes a bin. The bin includes a base and at least one sidewall extending upward from the base. An inner cavity is defined by the base and the at least one sidewall of the bin. The holder assembly is pivotally coupled to the bin and comprises a support feature and a holder feature coupled to the support feature. The holder assembly is configured to pivot from a stowed position, wherein the uppermost portion of the holder assembly is a first distance from the base of the bin, to an open position, wherein the uppermost portion of the holder assembly is a second distance from the base of the bin. The holder feature is operable to translate relative to the support feature when the holder assembly is in the open position from a retracted position to an extended position. The uppermost portion of the holder feature is a third distance from the base of the bin when the holder feature is in the extended position. The first distance is greater than the second distance, and the third distance is greater than the first distance.

Embodiments of the second aspect of the invention can include any one or a combination of the following features:
  the support feature comprises a hinge feature pivotally coupled to the bin, and a panel member coupled to the hinge feature;
  the holder feature comprises a body member translatably coupled to the panel member of the support feature, and a receptacle configured to hold an item coupled to the body member;
  the holder feature comprises a lip feature coupled to the uppermost portion of the body member, wherein the lip feature is configured to overhang the panel member of the support feature;
  the panel member of the support feature is generally planar to the body member of the holder feature when the holder assembly is in the stowed position and the open position, and when the holder feature is in the retracted position and in the extended position;
  the panel member of the support feature is substantially flush with at least a portion of the at least one sidewall of the bin when the holder assembly is in the stowed position; and
  the panel member of the support feature at least partially defines the inner cavity when the holder assembly is in the stowed position.

According to yet another aspect of the present disclosure, an assembly for holding an item in a vehicle is disclosed. The assembly includes a bin. An inner cavity is defined by the bin. A pocket is defined by the bin and is adjacent to the inner cavity. A holder assembly is pivotally coupled to the bin. The holder assembly includes a support feature and a holder feature. The holder assembly is configured to pivot into the inner cavity from a stowed position, wherein the holder assembly substantially divides the inner cavity from the pocket, to an open position. The holder feature is operable to translate relative to the support feature between a retracted position and an extended position.

Embodiments of the third aspect of the invention can include any one or a combination of the following features:
  the holder assembly is pivotally coupled to a portion of the bin that defines the pocket;
  the holder feature comprises a receptacle configured to hold an item, wherein the receptacle is disposed within the pocket defined by the bin when the holder assembly is in the stowed position;
  the receptacle of the holder feature comprises a base upon which an item is configured to rest, and an aperture defined by the base through which a power cord may extend;
  the holder assembly does not substantially divide the inner cavity of the bin from the pocket of the bin when the holder assembly is in the open position;
  the support feature is configured to partially define the inner cavity when the holder assembly is in the stowed position; and
  the holder feature is configured to partially define the pocket when the holder assembly is in the stowed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
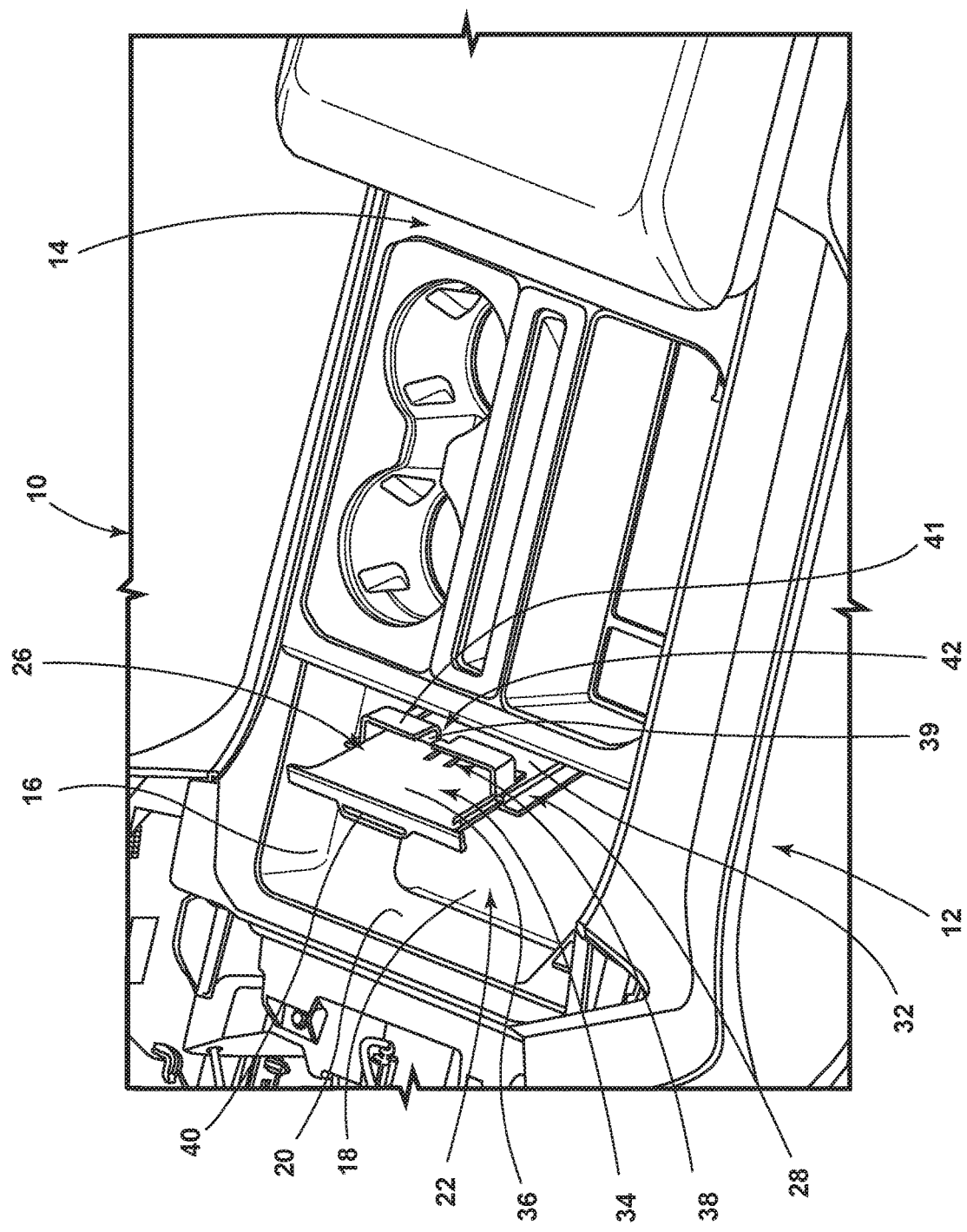
FIG. 1 is a perspective view of an interior of a vehicle equipped with a floor console assembly having a bin, illustrating a holder assembly in an open position and a holder feature in an extended position, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-5, an assembly for holding an item in a vehicle 10 is disclosed. The assembly includes a bin 16 that defines an inner cavity 22. A holder assembly 26 is pivotally coupled to the bin 16, and comprises a support feature 28 and a holder feature 34 coupled to the support feature 28. The holder assembly 26 is configured to pivot into the inner cavity 22 defined by the bin 16 from a stowed position to an open position. The holder feature 34 is operable to translate relative to the support feature 28 between a retracted position and an extended position.

Figure 2:
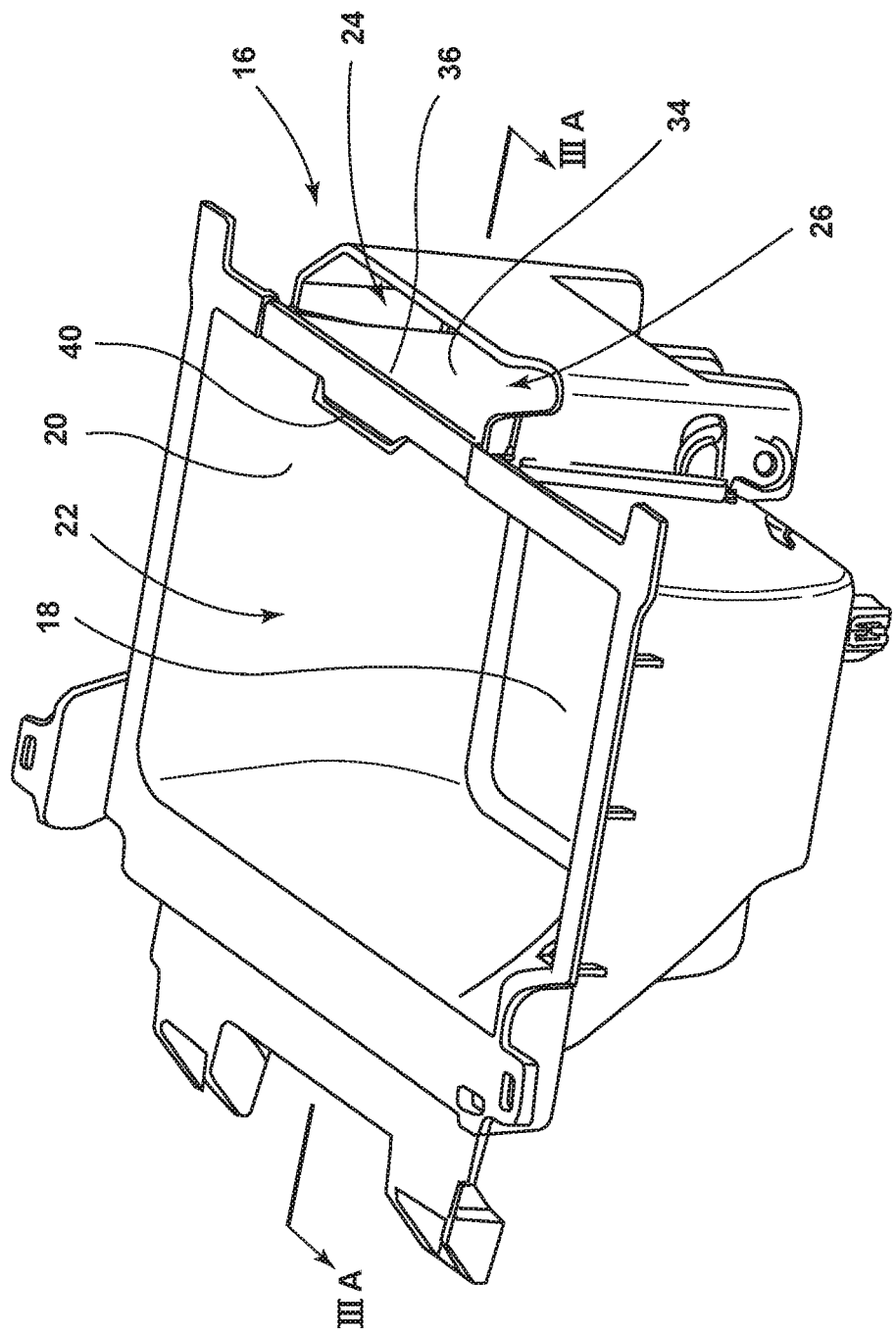
FIG. 2 is an upper elevational view of the bin, illustrating the holder assembly in a stowed position, according to one embodiment.

Referring now to FIG. 1, a portion of a vehicle interior of the vehicle 10 is disclosed A floor console assembly 14 is disposed within the vehicle interior 12. In some embodiments, the floor console assembly 14 may be a center console, as is depicted in FIG. 1. The floor console assembly 14 may be generally located between a front driver's seat and a front passenger's seat of the vehicle 10. The floor console assembly 14 has the bin 16 provided therein that may be accessible to a driver or passenger of the vehicle, according to one embodiment. As shown in FIG. 2, the bin 16 may include a base 18 and at least one sidewall 20 extending upward from the base 18. An inner cavity 22 may be defined by the bin 18. In various embodiments, the inner cavity 22 may be defined by the sidewalls 20 and the base 18 of the bin 16. In various embodiments, the bin 16 may define a pocket 24. The pocket 24 may be adjacent to the inner cavity 22 of the bin 16.

Figure 3A:
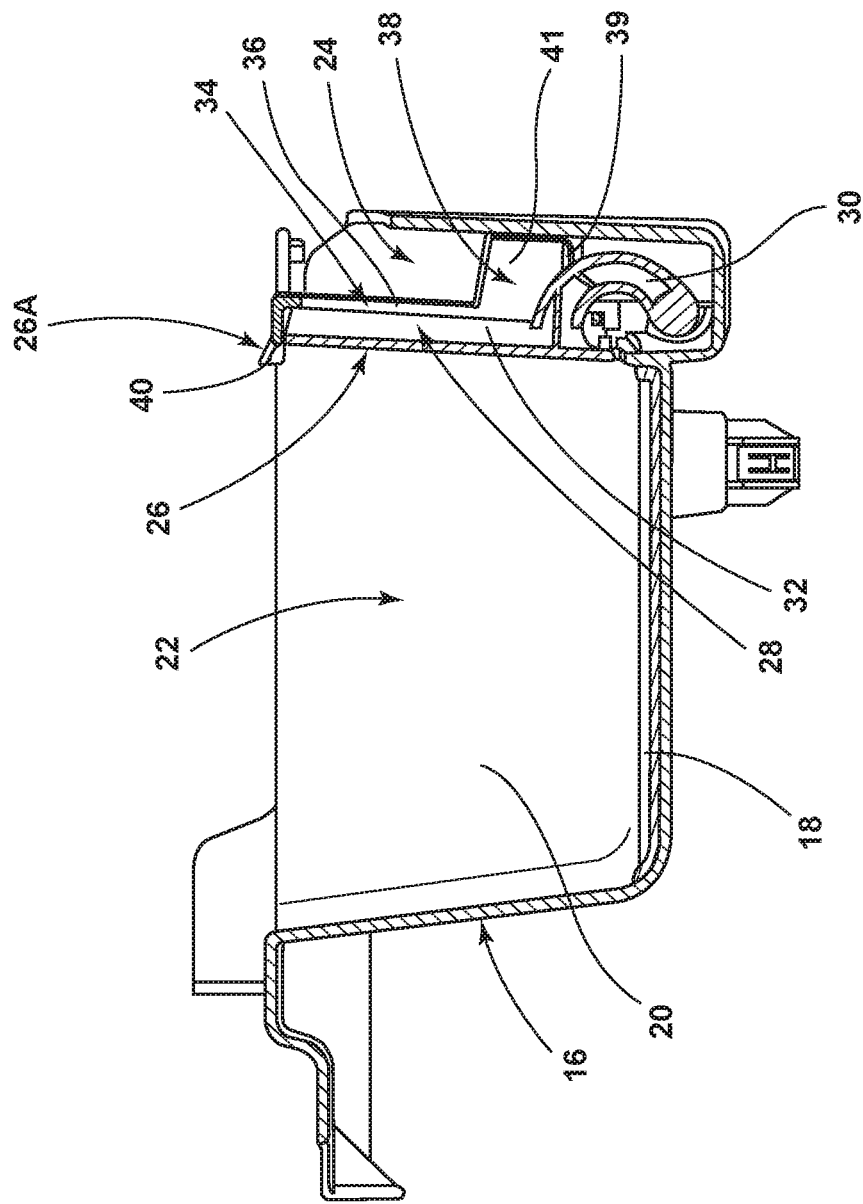
FIG. 3A is a cross-sectional side view of the bin taken through line IIIA-IIIA of FIG. 2, illustrating the holder assembly in a stowed position within a pocket of the bin, according to one embodiment.
Figure 3B:
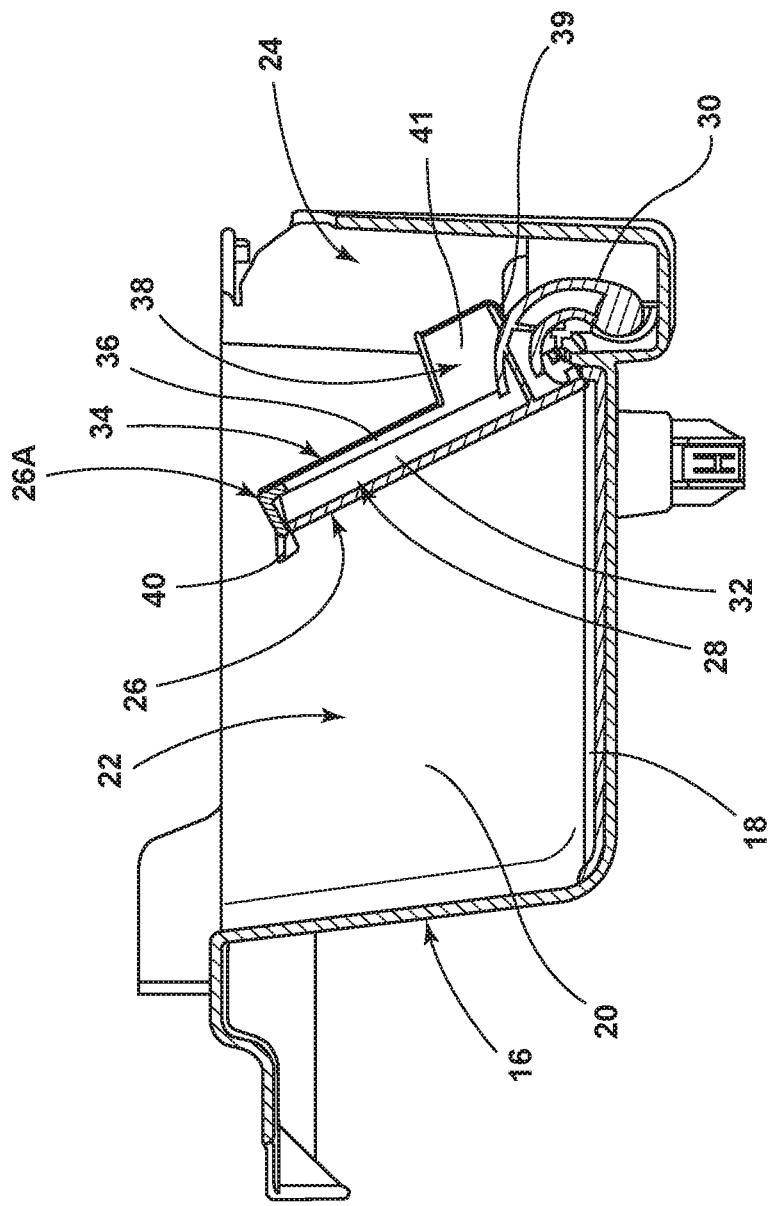
FIG. 3B is a cross-sectional side view of the bin taken through line IIIA-IIIA of FIG. 2, illustrating the holder assembly in an open position, according to one embodiment.
Figure 3C:
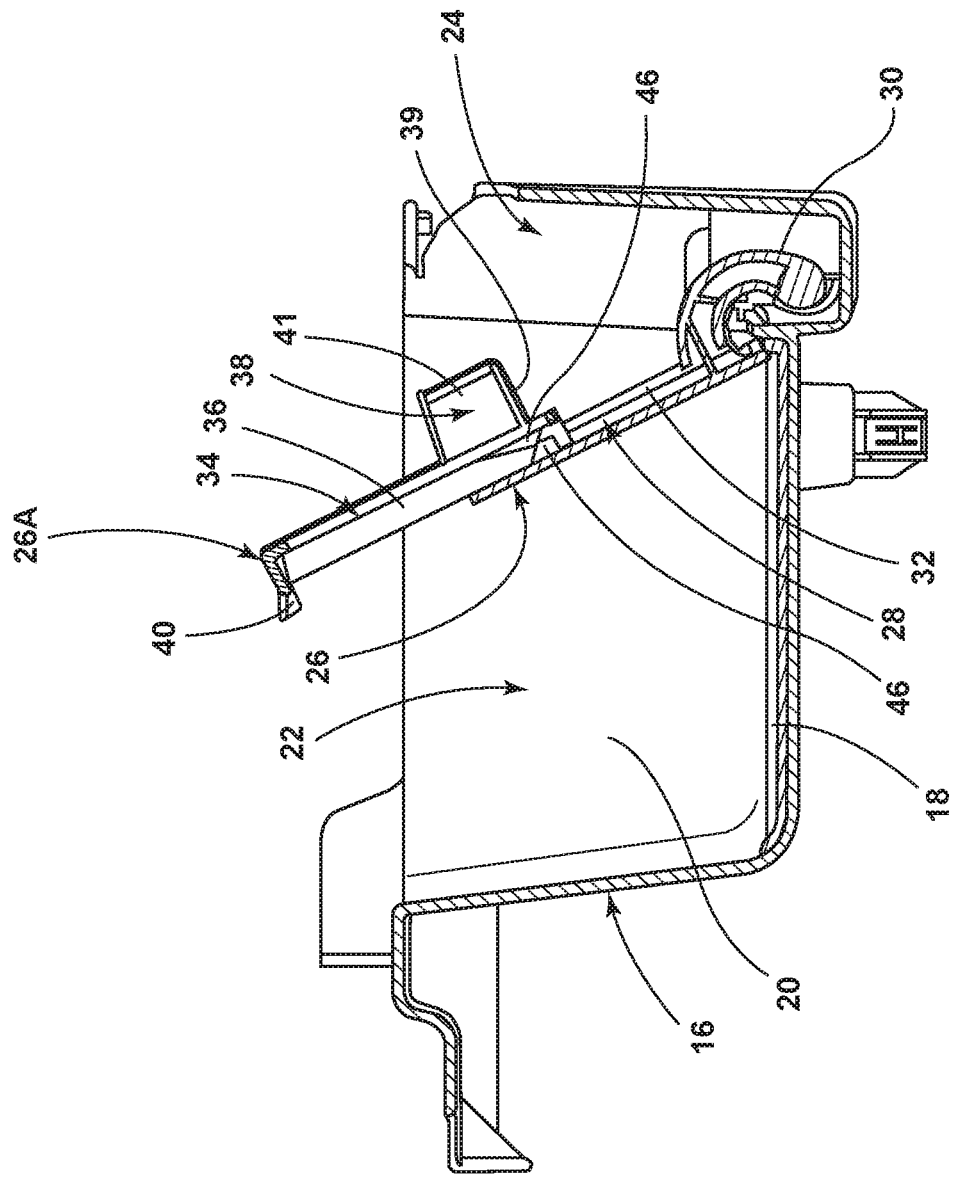
FIG. 3C is a cross-sectional side view of the bin taken through line IIIA-IIIA of FIG. 2, illustrating the holder assembly in the open position and the holder feature in the extended position, according to one embodiment.

Referring now to FIGS. 1-3C, the holder assembly 26 may be coupled to the bin 16. In various embodiments, the holder assembly 26 may be pivotally coupled to the bin 16. As shown in FIGS. 1 and 3A-3C, in some embodiments, the holder assembly 26 may include a support feature 28 and a holder feature 34. The support feature 28 may include a hinge feature 30. A panel member 32 may be coupled to the hinge feature 30. In various embodiments, the hinge feature 30 may be pivotally coupled to the bin 16. In some embodiments, the hinge feature 30 may be pivotally coupled to the portion of the bin 16 defining the pocket 24, as is illustrated in FIGS. 3A-3C. It is contemplated that the hinge feature 30 and the panel member 32 of the support feature 28 may be integrally coupled.

Figure 5:
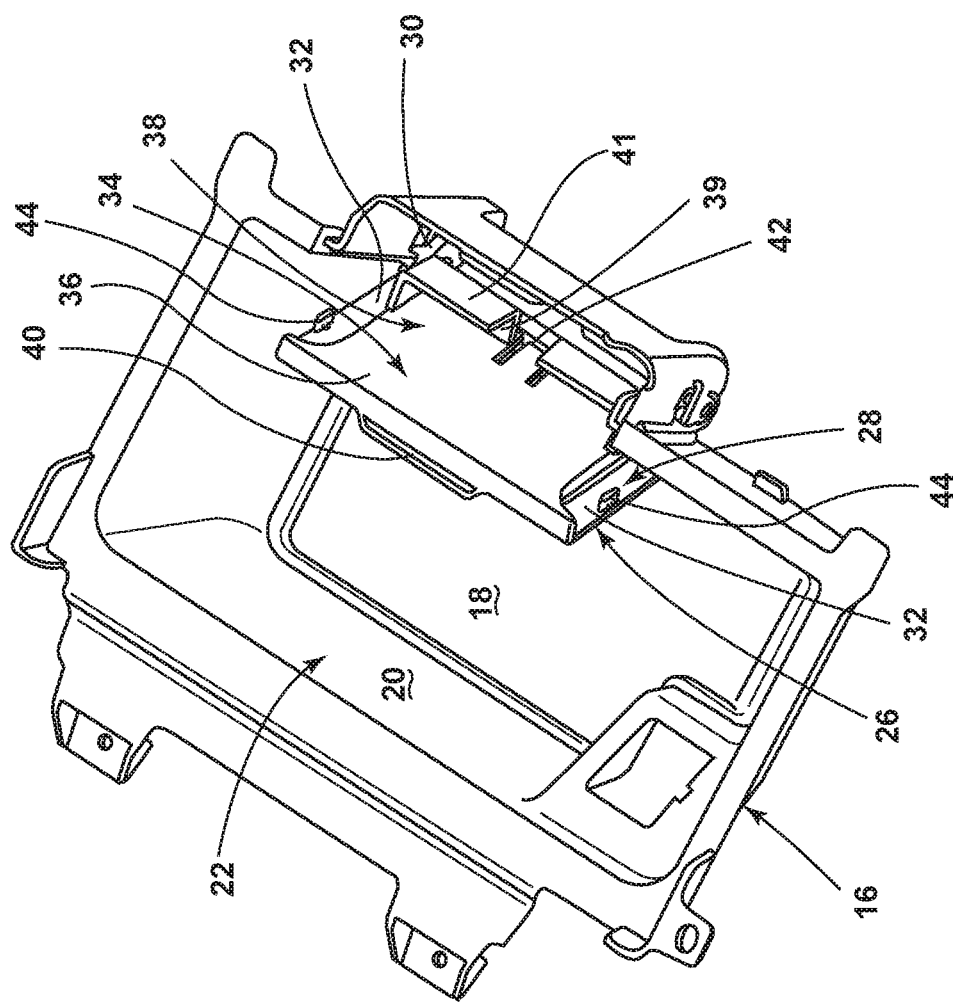
FIG. 5 is an upper elevational view of the bin, illustrating a receptacle coupled to the holder feature and an aperture in the receptacle, according to one embodiment.

In further reference to FIGS. 1 and 3A-3C, the holder feature 34 may be coupled to the support feature 28. In various embodiments, the holder feature 34 may include a body member 36. A receptacle 38 may be coupled to the body member 36. In various embodiments, the receptacle 38 may be configured to hold an item. For example, as shown in FIG. 5, the receptacle 38 may include a base portion 39 and at least one wall 41. The base portion 39 and the at least one wall 41 may receive and retain an item for a user, such as a cellular phone or credit card. It is contemplated that the receptacle 38 may hold a variety of items. In some embodiments, as is shown in FIG. 5, the receptacle 38 may include an aperture 42. The aperture 42 may be disposed and/or defined by the base portion 39 of the receptacle 38 and/or the at least one wall 41 of the receptacle 38, and may be configured to allow a power cord into the receptacle 38.

In some embodiments, a lip feature may be coupled to the body member 36 of the holder feature 34. In some embodiments, the lip feature 40 may be coupled to the uppermost part of the body member 36, as shown in FIGS. 3A-3C. The lip feature 40 may be configured to overhang the support feature 28. For example, as shown in FIG. 3A, the lip feature 40 may extend above the body member 36 of the holder feature 34 and may protrude outward from the body member 36, such that the lip feature 40 provides a ledge that may be gripped by a user. It is contemplated that, in various embodiments, the body member 36, the receptacle 38, and the lip feature 40 of the holder feature 34 may be integrally coupled.

Referring now to FIGS. 3A-3C, the holder feature 34 may be movably coupled to the support feature 28. In various embodiments, the holder feature 34 may be translatably coupled to the support feature 28. In other words, the holder feature 34 may be movably coupled to the support feature 28 such that the holder feature 34 may translate relative to the support feature 28. For example, as shown in FIGS. 3A-3C, the body member 36 of the holder feature 34 may be translatably coupled to the panel member 32 of the support feature 28. The holder feature 34 may be translatably coupled to the support feature 28 via at least one of a variety of features (e.g., tongue and groove, slide rails, etc.).

In further reference to FIGS. 3A-3C, the holder assembly 26 may be operable to move between a stowed position and an open position. In various embodiments, the holder assembly 26 may be configured to pivot from the stowed position to the open position. In some embodiments, as shown in FIGS. 3A-3C, the holder assembly 26 may be configured to pivot into the inner cavity 22. For example, in some embodiments, the holder assembly 26 may move from the stowed position to the open position as the hinge feature 30 of the support feature 28 pivots relative to the bin 16 causing the support feature 28 and the holder feature 34 coupled to the support feature 28 to pivot toward the inner cavity 22 defined by the bin 16.

In various embodiments, the holder assembly 26 may partially define the inner cavity 22 when the holder assembly 26 is in the stowed position. In other words, the holder assembly 26 may define the inner cavity 22 of the bin 16 along with the base 18 and the at least one sidewall 20 of the bin 16. In some embodiments, the support feature 28 may be configured to partially define the inner cavity 22 when the holder assembly 26 is in the stowed position. Further, in some embodiments, the holder feature 34 may be configured to partially define the pocket 24 when the holder assembly 26 is in the stowed position. In some embodiments, the receptacle 38 may be disposed within the pocket 24 defined by the bin 16 when the holder assembly 26 is in the stowed position, as shown in FIG. 3A. In some embodiments, the holder assembly 26 may generally, substantially, and/or majorly divide the inner cavity 22 from the pocket 24. In other words, the holder assembly 26 may be disposed between the inner cavity 22 and the pocket 24 when the holder assembly 26 is in the stowed position, as is shown in FIGS. 2 and 3A. In some embodiments, the panel member 32 of the support feature 28 may be disposed generally vertically when the holder assembly 26 is in the stowed position. In some embodiments, the panel member 32 of the support feature 28 may be generally, substantially, and/or majorly flush with at least a portion of the at least one sidewall 20 of the bin 16 when the holder assembly 26 is in the stowed position.

In further reference to FIGS. 1 and 3A-3C, in various embodiments, the holder assembly 26 may not substantially divide the inner cavity 22 of the bin 16 from the pocket 24 of the bin 16 when the holder assembly 26 is in the open position. In other words, when the holder assembly 26 is in the open position, as shown in FIGS. 1, 3B, and 3C, the inner cavity 22 may be in fluid communication with the pocket 24, generally unimpeded by the holder assembly 26. In some embodiments, the holder assembly 26 may pivot into the inner cavity 22. The holder assembly 26 may pivot vehicle forward into the inner cavity 22. In such an embodiment, the holder assembly 26 may be positioned at the vehicle rearward end of the inner cavity 22 while in the stowed position. As shown in FIGS. 2-3C, in such an embodiment, the pocket 24 may be positioned vehicle rearward of the inner cavity 22. It is contemplated that, in various embodiments, the holder assembly 26 may pivot various vehicle directions into the inner cavity 22. Accordingly, it is contemplated that, in various embodiments, the holder assembly 26 may be positioned at various vehicle-directional ends of the inner cavity 22, and further that the pocket 24 may be positioned various vehicle-directions relative to the inner cavity 22.

Figure 4:
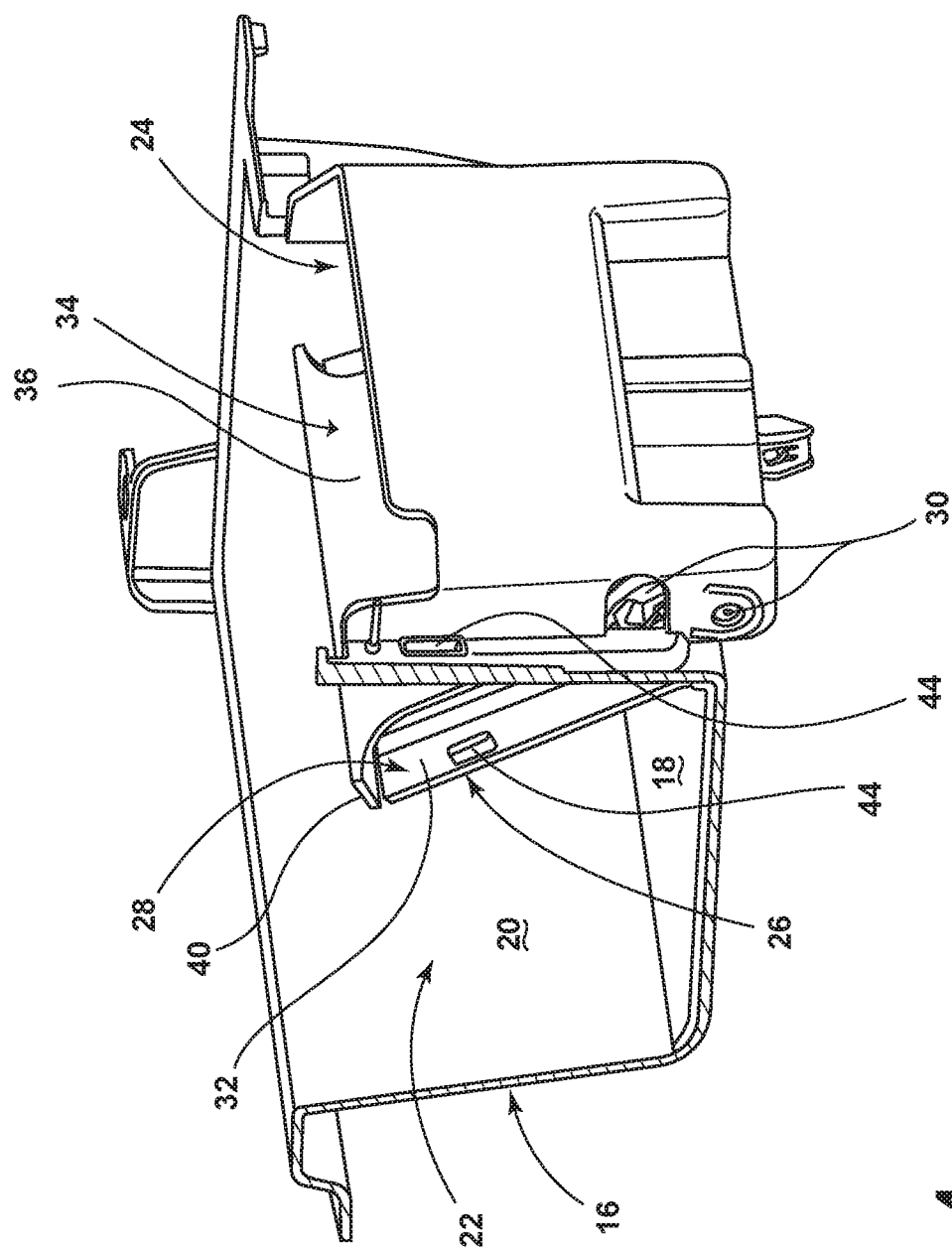
FIG. 4 is a partial cross-sectional perspective view of the bin, illustrating corresponding retention features coupled to the bin and a support feature of the holder assembly, according to one embodiment.

Referring now to FIG. 4, corresponding retention features 44 may be coupled to and/or disposed on the holder assembly 26 and the bin 16. For example, as shown in FIG. 4, the support feature 28 includes the retention feature 44 that corresponds to the retention feature 44 disposed on the bin 16, which is depicted as a slot configured to receive the corresponding retention feature 44 of the support feature 28. The corresponding retention features 44 may be configured to releasably maintain the holder assembly 26 in the stowed position. It is contemplated that the corresponding retention features 44 may include at least one of a variety of features configured to retain (e.g., push-push mechanism, magnets, hook and loop, snaps, friction fittings, etc.). It is further contemplated that, in some embodiments, the corresponding retention features 44 may be coupled to the bin 16, the support feature 28, the holder feature 34, and/or a combination thereof.

Referring now to FIGS. 1, 3B, and 3C, the holder feature 34 may be operable to move between the retracted position, as shown in FIG. 3B, and the extended position, as shown in FIG. 3C. In various embodiments, the holder feature 34 may move from the retracted position to the extended position via translation relative to the support feature 28. In some embodiments, the holder feature 34 may be moved from the retracted position to the extended position when the holder assembly 26 is in the open position and/or when the holder assembly 26 is not in the stowed position. In other words, the holder feature 34 may be prevented from moving from the retracted position to the extended position when the holder assembly 26 is in the stowed position. In some embodiments, the holder feature 34 may move from the retracted position to the extended position in response to holder assembly 26 moving from the stowed position to the open position. For example, in some embodiments, the holder feature 34 may be biased toward the extended position by a spring or other biasing feature, and movement of the holder assembly 26 out of the stowed position may allow the holder feature 34 to move toward the extended position in accordance with the biasing force being applied. As shown in FIG. 3C, corresponding detent features 46 may be coupled to and/or disposed on the holder feature 34 and the support feature 28. Corresponding detent features 44 may be configured to releasably maintain the holder feature 34 in the extended and/or retracted position relative to the support feature 28. It is contemplated that the detent features 46 may include any one of a variety of corresponding features configured to act as a detent mechanism that would be known to a person having ordinary skill in the art. It is further contemplated that, in some embodiments, the holder feature 34 may be maintained in the extended position by a spring or other biasing feature.

Referring now to FIGS. 3A-3C, in various embodiments, the panel member 32 of the support feature 28 may be generally, substantially, and/or majorly planar to the body member 36 of the holder feature 34 when the holder assembly 26 is in the stowed position and/or the open position, and/or when the holder feature 34 is in the retracted position and/or the extended position. In various embodiments, the uppermost portion 26A of the holder assembly 26 is a first distance from the base 18 of the bin 16 when the holder assembly 26 is in the open position, the uppermost portion 26A of the holder assembly 26 is a second distance from the base 18 of the bin 16 when the holder assembly 26 is in the stowed position, and the uppermost portion 26A of the holder assembly 26 is a third distance from the base 18 of the bin 16 when the holder assembly 26 is in the open position, and the holder feature 34 is in the extended position relative to the support feature 28. In some embodiments, the first distance is greater than the second distance and the third distance is greater than the first distance.

In operation, a vehicle occupant may store an item, such as a cellphone or a credit card, in the receptacle 38 of the holder feature 34 while the holder assembly 26 is in the stowed position. The vehicle occupant, in some embodiments, may access the item stored in the receptacle 38 by utilizing the lip feature 40 to urge the holder assembly 26 to pivot inner cavity 22 inboard from the stowed position to the open position, and then utilize the lip feature 40 to translate the holder feature 34 relative to the support feature 28 from the retracted position to the extended position. When the holder assembly 26 is in the open position and the holder feature 34 is in the extended position, a vehicle occupant may be able to conveniently access the item stored in the receptacle 38 and/or view the item stored in the receptacle 38 without removing the item from the receptacle 38.

The present disclosure may provide a variety of advantages. First, the holder assembly 26, while in the stowed position, may be aesthetically streamlined in appearance. Second, the ability to move the holder assembly 26 from the stowed position to the open position and move the holder feature 34 from the retracted position to the extended position may enable a user to conveniently access or view an item stored in the receptacle 38. Third, the corresponding detent features 46 may enable the holder feature 34 to remain in the extended position for the convenience of a vehicle occupant. Fourth, the aperture 42 in the receptacle 38 may enable a power cord to reach and charge an electronic device disposed within the receptacle 38. While the assembly is shown and described herein as a floor console assembly, it should be appreciated that the assembly may be located at other locations on the vehicle, according to other embodiments.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assembly for holding an item in a vehicle, comprising:
    a bin having a rim defining an opening to an inner cavity; and
    a holder assembly pivotally coupled to the bin, and comprising:
        a support feature; and
        a holder feature coupled to the support feature, wherein the holder assembly is configured to pivot into the inner cavity defined by the bin from a stowed position to an open position, the holder feature is operable to remain coupled with and translate relative to the support feature between a retracted position and an extended position, the uppermost portion of the holder assembly when the holder assembly is in the open position and the holder feature is in the retracted position is bin-downward of the rim, and the uppermost portion of the holder assembly when the holder assembly is in the open position and the holder feature is in the extended position is bin-upward of the rim.

2. The assembly for holding an item in a vehicle of claim 1, wherein the holder feature comprises:
    a receptacle configured to hold an item.

3. The assembly for holding an item in a vehicle of claim 1, wherein the holder assembly is configured to pivot vehicle forward from the stowed position to the open position.

4. The assembly for holding an item in a vehicle of claim 1, wherein the holder assembly partially defines the inner cavity when the holder assembly is in the stowed position.

5. The assembly for holding an item in a vehicle of claim 1, wherein the support feature comprises:
    a hinge feature pivotally coupled to the bin; and
    a panel member coupled to the hinge feature.

6. The assembly for holding an item in a vehicle of claim 5, wherein the panel member of the support feature is disposed generally vertically when the holder assembly is in the stowed position.

7. A floor console assembly for holding an item in a vehicle, comprising:
    a bin, comprising:
        a base; and
        at least one sidewall extending upward from the base;
    an inner cavity defined by the base and the at least one sidewall of the bin; and
    a holder assembly pivotally coupled to the bin, wherein the holder assembly comprises:
        a support feature; and
        a holder feature coupled to the support feature, wherein the holder assembly is configured to pivot from a stowed position, wherein the uppermost portion of the holder assembly is a first distance from the base of the bin, to an open position, wherein the uppermost portion of the holder assembly is a second distance from the base of the bin, and wherein the holder feature is operable to remain coupled with and translate relative to the support feature when the holder assembly is in the open position from a retracted position to an extended position, wherein the uppermost portion of the holder feature is a third distance from the base of the bin, and wherein the first distance is greater than the second distance, and the third distance is greater than the first distance.

8. The floor console assembly for holding an item in a vehicle of claim 7, wherein the support feature comprises:
a hinge feature pivotally coupled to the bin; and
a panel member coupled to the hinge feature.

9. The floor console assembly for holding an item in a vehicle of claim 8, wherein the holder feature comprises:
a body member translatably coupled to the panel member of the support feature; and
a receptacle configured to hold an item coupled to the body member.

10. The floor console assembly for holding an item in a vehicle of claim 9, wherein the holder feature further comprises:
a lip feature coupled to the uppermost portion of the body member, wherein the lip feature is configured to overhang the panel member of the support feature.

11. The floor console assembly for holding an item in a vehicle of claim 9, wherein the panel member of the support feature is generally planar to the body member of the holder feature when the holder assembly is in the stowed position and the open position, and when the holder feature is in the retracted position and the extended position.

12. The floor console assembly for holding an item in a vehicle of claim 9, wherein the panel member of the support feature is substantially flush with at least a portion of the at least one sidewall of the bin when the holder assembly is in the stowed position.

13. The floor console assembly for holding an item in a vehicle of claim 12, wherein the panel member of the support feature at least partially defines the inner cavity when the holder assembly is in the stowed position.

14. An assembly for holding an item in a vehicle, comprising:
a bin having a base and at least one sidewall extending upward from the base;
an inner cavity defined by the bin;
a pocket defined by the bin and adjacent to the inner cavity; and
a holder assembly pivotally coupled to the bin, wherein the holder assembly comprises:
a support feature; and
a holder feature, wherein the holder assembly is configured to pivot into the inner cavity from a stowed position, wherein the holder assembly substantially divides the inner cavity from the pocket and the uppermost portion of the holder assembly is a first distance from the base, to an open position, wherein the uppermost portion of the holder assembly is a second distance from the base, and wherein the holder feature is operable to remain coupled with and translate relative to the support feature between a retracted position and an extended position, wherein the uppermost portion of the holder assembly is a third distance from the base, wherein the first distance is greater than the second distance, and the third distance is greater than the first distance.

15. The assembly for holding an item in a vehicle of claim 14, wherein the holder assembly is pivotally coupled to a portion of the bin that defines the pocket.

16. The assembly for holding an item in a vehicle of claim 14, wherein the holder feature comprises:
a receptacle configured to hold an item, wherein the receptacle is disposed within the pocket defined by the bin when the holder assembly is in the stowed position.

17. The assembly for holding an item in a vehicle of claim 16, wherein the receptacle of the holder feature comprises:
a base upon which an item is configured to rest; and
an aperture defined by the base through which a power cord may extend.

18. The assembly for holding an item in a vehicle of claim 14, wherein the holder assembly does not substantially divide the inner cavity of the bin from the pocket of the bin when the holder assembly is in the open position.

19. The assembly for holding an item in a vehicle of claim 14, wherein the support feature is configured to partially define the inner cavity when the holder assembly is in the stowed position.

20. The assembly for holding an item in a vehicle of claim 19, wherein the holder feature is configured to partially define the pocket when the holder assembly is in the stowed position.

* * * * *